US011498268B2

(12) United States Patent
Holt et al.

(10) Patent No.: US 11,498,268 B2
(45) Date of Patent: Nov. 15, 2022

(54) METHOD OF MAKING 3D PRINTED OBJECTS BY DISPENSING SEQUENTIAL LAYERS OF MATERIAL

(71) Applicant: PhotoCentriC Limited, Peterborough (GB)

(72) Inventors: Paul Holt, Peterborough (GB); Richard Fletton, Peterborough (GB); Hanifeh Zarezadeh, Peterborough (GB)

(73) Assignee: PhotoCentriC Limited, Peterborough (GB)

( * ) Notice: Subject to any disclaimer, the term of this patent is extended or adjusted under 35 U.S.C. 154(b) by 94 days.

(21) Appl. No.: 16/808,750

(22) Filed: Mar. 4, 2020

(65) Prior Publication Data
US 2020/0282637 A1     Sep. 10, 2020

(30) Foreign Application Priority Data

Mar. 4, 2019 (GB) ..................................... 1902883

(51) Int. Cl.
*B29C 64/129* (2017.01)
*B29C 64/357* (2017.01)
(Continued)

(52) U.S. Cl.
CPC .......... *B29C 64/129* (2017.08); *B29C 64/118* (2017.08); *B29C 64/124* (2017.08); (Continued)

(58) Field of Classification Search
CPC ... B29C 64/124; B29C 64/291; B29C 64/321; B29C 64/357
See application file for complete search history.

(56) References Cited

U.S. PATENT DOCUMENTS 5,573,721 A * 11/1996 Gillette .................. B33Y 10/00
                                                      118/712
5,626,919 A *  5/1997 Chapman .............. B29C 64/135
                                                      427/512
(Continued)

FOREIGN PATENT DOCUMENTS

CN          101024307 A  *  8/2007
KR       20160109153 A        9/2016
(Continued)

OTHER PUBLICATIONS

Great Britain Search Report issued in counterpart GB Application No. 1902883.6 dated Aug. 15, 2019.

*Primary Examiner* — Atul P. Khare
(74) *Attorney, Agent, or Firm* — Nexsen Pruet, PLLC; E. Eric Mills; Nicholas P. Stadnyk (57) ABSTRACT

This method describes techniques to create 3D parts by dispensing a liquid polymer or slurry in evenly delivered layers, which are exposed to light from a visual display screen before the print platform upon which it is being built is moved one-layer thickness away and the process is repeated. The process of dispensing the photosensitive material is via a pumped system through a metering device that discharges and levels the material. Multiple dispensing devices can be arranged in sequence to deliver different materials, either multiple photosensitive dispensing heads or alternative mechanisms such as robocasting, fused deposition modelling or inkjet in addition to a photosensitive deposition head.

26 Claims, 4 Drawing Sheets

(51) Int. Cl.
*B29C 64/124* (2017.01)
*B29C 64/209* (2017.01)
*B29C 64/264* (2017.01)
*B29C 64/232* (2017.01)
*B29C 64/118* (2017.01)
*B29C 64/218* (2017.01)
*B29C 64/286* (2017.01)
*B33Y 70/00* (2020.01)
*B29K 105/00* (2006.01)
*B33Y 10/00* (2015.01)
*B33Y 30/00* (2015.01)

(52) U.S. Cl.
CPC .......... *B29C 64/209* (2017.08); *B29C 64/218* (2017.08); *B29C 64/232* (2017.08); *B29C 64/264* (2017.08); *B29C 64/286* (2017.08); *B29C 64/357* (2017.08); B29K 2105/0002 (2013.01); B33Y 10/00 (2014.12); B33Y 30/00 (2014.12); B33Y 70/00 (2014.12)

(56) References Cited

U.S. PATENT DOCUMENTS

| | | | | |
|---|---|---|---|---|
| 7,847,212 | B2* | 12/2010 | Renz | B29C 64/153 219/121.61 |
| 8,114,569 | B2* | 2/2012 | Holt | G03F 7/70291 430/300 |
| 8,666,142 | B2* | 3/2014 | Shkolnik | B33Y 80/00 382/154 |
| 8,894,400 | B2* | 11/2014 | Costabeber | B29C 64/124 425/375 |
| 10,343,390 | B2* | 7/2019 | Knecht | B29C 64/268 |
| 10,350,823 | B2* | 7/2019 | Rolland | G03F 7/029 |
| 10,442,176 | B2* | 10/2019 | Welch | B33Y 40/00 |
| 10,792,868 | B2* | 10/2020 | Ermoshkin | B33Y 30/00 |
| 10,821,668 | B2* | 11/2020 | Thompson | B22F 3/26 |
| 10,821,669 | B2* | 11/2020 | Thompson | B29C 64/255 |
| 11,192,302 | B2* | 12/2021 | Rademacher | B29C 64/35 |
| 2015/0139849 | A1* | 5/2015 | Pialot, Jr. | B23K 26/342 425/174 |
| 2018/0141270 | A1* | 5/2018 | Steege | B29C 64/214 |
| 2018/0186073 | A1* | 7/2018 | Dial | B33Y 30/00 |
| 2018/0200948 | A1* | 7/2018 | Kuijpers | B29C 64/124 |
| 2019/0329321 | A1* | 10/2019 | Holt | B29C 64/291 |

FOREIGN PATENT DOCUMENTS

| | | | | |
|---|---|---|---|---|
| WO | WO-2016008876 A1 * | 1/2016 | ........... | B29C 64/124 |
| WO | 2018/091891 A1 | 5/2018 | | |

\* cited by examiner

METHOD OF MAKING 3D PRINTED OBJECTS BY DISPENSING SEQUENTIAL LAYERS OF MATERIAL

CROSS REFERENCE TO RELATED APPLICATIONS

This application claims priority under 35 U.S.C. § 119 to Great Britain Patent Application No. 1902883.6 filed Mar. 4, 2019, the entirety of which is incorporated by reference herein.

TECHNICAL FIELD

This invention relates to the field of 3D printing used to make a 3D object where a 3D printed object is formed by dispensing photosensitive layers on top of each other, each layer being exposed to electromagnetic radiation emitted from a visual display screen or emissive pixel array screen. The process of dispensing the photosensitive material is via a pumped system through a metering device that discharges and levels the material. Multiple dispensing devices can be arranged in sequence to deliver different materials, being either multiple photosensitive dispensing heads or photosensitive delivery heads with alternative mechanisms such as robocasting, FDM or inkjet.

BACKGROUND

Three-dimensional (3D) printing, also known as rapid prototyping or additive manufacturing, is a method of forming 3D objects by building up sequential layers, each layer defined by a digital representation. The digital representations may be formed by scanning a physical object in three-dimensions or may be formed by digitally sectioning a three-dimensional computer-aided design (CAD) image into layers, typically of equal thicknesses.

In stereolithography apparatus printing (SLA), the printer builds 3D objects from successive layers of selectively polymerised liquid photosensitive polymer (resin), also referred to as photopolymer. The liquid photopolymer is polymerised (hardened) by electromagnetic radiation exposure of an appropriate wavelength, e.g. visible light or near visible ultraviolet light. To form a 3D printed object by stereolithographic 3D printing, selective illumination by electromagnetic radiation is provided from an imaging source to form each layer, with the first layer being formed on a build platform, the separation distance between the build platform and imaging source being increased by the thickness of a layer with the next layer of selective polymerisation being formed on the preceding layer. The process of selective exposure and separation is repeated until the complete 3D printed object has been built. layer by layer.

In traditional 3D printing, photopolymer was selectively hardened by light emitted from a laser beam or by focusing the light from a digital light processing (DLP) projector emitted through its digital mirror device. This could be irradiated onto either the upper or lower layer of resin in a vat. This invention relates to the field of 3D printing where the image source is a visual display screen, commonly an LCD screen. LCD screens have recently become widely used by manufacturers who have incorporated the screens as the digital mask to deliver the custom photopolymerisation. LCD screens are particularly attractive as an image creation device in 3D printers because they are mass manufactured consumer items and are therefore available at very low cost. Furthermore, they generate very high-resolution images driven by the demand to view higher and higher image quality images on them. They also expose an entire layer of the vat simultaneously, with very even light distribution without any requirement to refocus the light through a lens. They are available in a wide variety of formats from the very small screens used in near-eye headsets, through mobiles, tablets, monitors up to TV screens. They are also simpler to incorporate into 3D printers than the competitive technologies. In the case of a laser 3D printer, complex electronics and galvanometers are required and correspondingly in the case of a DLP printer a lens is required to refocus the widening light beam back into a smaller area. In contrast, visual display screen device-based 3D printers are effectively a digitally controllable light mask that defines the area of the build platform with an optionally modified light generation source, an electronic control board, a linear drive and typically a resin containment vat.

In the conventional process of making an object by SLA printing; the object is created by sequential exposure of liquid photopolymer to light in layers, interspersed by motion perpendicularly away from the light generation surface, the finished object is then elevated from the photopolymer vat, the resin attached to the surface of the object being allowed to drain back into the vat, the print platform to which the object has been built upon is then typically removed from the printer by hand and transferred to a wash station where it is washed with a solvent solution to remove any remaining liquid resin attached to the object, it is then rinsed and transferred to a separate post exposure station where it is irradiated with uniform light of a similar wavelength to that which created the object in the first place, optionally this process can take place under water or with heat, before it is rinsed again and dried ready for use.

Printers have typically been orientated such that the photopolymer is contained in a vat that is above the screen, either in contact with it or separated by a gap from it, in this case the platform moves from the bottom upwards as it prints, known as bottom-up or reverse SLA. In the case of this bottom up orientation the vat must have a light transmitting lower layer which can be a film which provides the properties of being very low surface energy to reduce sticking and have high light transmittance with low haze to reduce refraction. Alternatively, it is possible to orientate the vat below the screen such that the platform starts at the top and moves downwards through the process of the print, known as top-down or conventional SLA. In this case, as with bottom-up, the screen can either be in contact with the resin or have a separation gap filled with a release medium such as air. These vat-based systems have a number of drawbacks, they can frequently leak, but most significantly the excess volume of resin in the vat causes increased forces when the part is lifted from the interface after building each layer.

SUMMARY

It is an object of this invention to provide an alternative method of selectively hardening the polymer without the use of a vat. It achieves this by dispensing single layers of a photosensitive material, exposing them to light from the visual display screen and moving the exposed layer away from the screen by the layer thickness, ready for the next layer to be laid down in the same manner. Just as described previously, with the two orientations of the conventional SLA process, this invention can be orientated such that the build platform is below the screen and descends away from it layer by layer, or is above it and moves upwards away from the screen in the same manner.

In a first aspect of this invention is provided a method for creating 3D objects, the method comprising:
a) dispensing a layer of light-curable material;
b) subjecting the layer of light-curable material to light from a visual display screen to selectively solidify it;
c) moving the visual display screen and the build platform away from each other to enable the dispensing head to pass;
d) repeating steps a) to c) at least once to form the 3D object (i.e. dispense at least one further layer on top of the previously cured layer to form the 3D object).

Aptly, the layer of light-curable material is dispensed to a build plate. Aptly, prior to the initial layer being dispensed, the build plate is free from uncured material.

In a second aspect of this invention is provided a method for creating 3D objects where a first light-curable material is dispensed from a first dispensing head and a second light-curable material is dispensed from a second dispensing head and at least one of the layers of light curable material comprises the first light curable material and at least one of the layers of the light curable material comprises the second light curable material.

In a third aspect of this invention is provided a method of creating 3D objects where the first dispensing head of photocurable material is combined with a robocasting head.

In a fourth aspect of this invention is provided a method of creating 3D objects where the first dispensing head of photocurable material is combined with an inkjet head.

In a fifth aspect of this invention is provided a method of creating 3D objects where the first dispensing head of photocurable material is combined with a fused deposition modelling head.

In a sixth aspect of this invention is provided a method of creating 3D objects where the light-curable material comprises a photopolymer resin formulation comprising:
- at least one monomeric or oligomeric chemical species comprising at least one carbon-carbon, double bond that is polymerisable by free radical polymerisation being present at a total amount of 10-98 wt %;
- or at least one monomeric or oligomeric chemical species comprising at least one heterocyclic moiety that is polymerisable by cationic polymerisation being present at a total amount of 10-98 wt %;
- at least one photoinitiator that absorbs visible blue, green or red light in the region between 400 nm and 700 nm present at a total amount of 0.1-10 wt %;
- at least one co-initiator;
- and optionally the formulation may contain a plurality of pigments and dyes.

In a seventh aspect of this invention is provided a light curable material comprising a plurality of particles suspended as a slurry in said photopolymer resin formulation.

Aptly, the dispensing mechanism for the slurry discharges only over the area that an object can be created within. In other words, the dispensing mechanism may only discharge slurry over the build platform/screen/container. Put another way, the dispensing heads may be shut-off between passes (where a pass corresponds to the movement of the dispensing head directly over the build platform/screen/container).

In an eighth aspect of this invention is provided an apparatus comprising:
- a build plate to hold a layer of a light-curable material;
- a visual display screen for subjecting the light-curable material on the build plate to light;
- a dispensing head for dispensing the light-curable material as a layer on the plate;
- and an actuator for varying the separation of the build surface and the tray.

In a ninth aspect of this invention is provided a method wherein the visual display screen is a liquid crystal display screen.

In a tenth aspect of this invention is provided a method wherein the liquid crystal display screen is a monochrome LCD screen.

In an eleventh aspect of this invention is provided a plurality of visual display screens laid out in the same horizontal plane; and wherein the single build platform is in a plane parallel to and aligned with the plurality of visual display screens.

In a further aspect of this invention the printer has at least one catch pot to allow excess dispensed material to be collected.

In a further aspect of this invention, the at least one catch pot is separated from, or spaced laterally from the build plate.

In a further aspect of this invention, the printer further comprises a fluid chamber, wherein the excess material captured by the at least one catch pot flows into the fluid chamber and is forced back to the dispensing head via a pump. That is, excess material is captured and redistributed to be dispensed as further layers as part of a closed-loop system.

In a further aspect of this invention, the printer further comprises a filter configured to filter the excess material before it is forced back to the dispensing head.

Typically, the light-curable material is a liquid. The solidified layer formed in step b) may comprise only material that formed part of the light curable liquid dispensed in step a), e.g. the photopolymer resin formulation of the sixth aspect. Thus, the 3D object may be solely derived from the light curable liquid dispensed in step a), e.g. the photopolymer resin formulation of the sixth aspect, and no further materials may be incorporated.

In some embodiments, methods described herein are techniques to create 3D parts by dispensing a liquid polymer or slurry in evenly delivered layers, which are exposed to light from a visual display screen before the print platform upon which it is being built and the visual display screen that illuminates it, are separated by a distance sufficient to enable the dispensing head to pass through. The process is then repeated. The process of dispensing the photosensitive material is via a pumped system through a metering device that discharges and levels the material. Excess material is collected away from the 3D part and then pumped round for use in dispensing further layers. As such, the system does not produce the 3D part from a vat of material/resin, provided as a precursor to construction. Instead, the material is dispensed layer-by-layer when needed, with excess material recycled as part of a closed loop system for efficiency.

Multiple dispensing devices can be arranged in sequence to deliver different materials, either multiple photosensitive dispensing heads or a dispensing head in combination with alternative mechanisms such as robocasting, FDM or inkjet in the same machine. This invention describes methods for creating a 3D object, the method comprising the formation of more than two layers of a cured photopolymer by exposing a liquid photopolymer resin comprising at least one photoinitiator to the light emitted by a visual display screen where the polymer is discharged layer by layer. Further, this method describes combining more than one dispensing head delivering different photopolymer materials. Additionally, the method combines the dispensing head delivering photopolymer material with an additional process such as FDM, robocasting or inkjet.

This method will enable printing without vats, eliminating the drawbacks that that form of containment have, enable layers of differing materials to be delivered, constructing parts of differing properties and also reducing delamination from excessive forces when the parts are lifted from the tray in conventional vat-based printing.

Traditional methods of 3D printing are described in Method for Making an Object WO 2016/181149 to Holt, Methods for making an object and formulations for use in said methods WO2017/051182 A1 to Holt, 3D printer Multiple Screens And Moveable Screen GB 1807823.8 to Holt and Methods for making a metal, sand or ceramic object by additive manufacture and formulations for use in said methods WO2018091891 to Holt et al.

BRIEF DESCRIPTION OF THE DRAWINGS

Examples are further described hereinafter with reference to the accompanying drawings.

DETAILED DESCRIPTION

The 3D printer in this invention may have a linear rail which will provide accurate, repeatable motion in the z-axis of 100 microns, preferably 50 microns or even 25 microns. There is no particular requirement for the construction or number of these drives, it is possible to have two drives at opposite sides of the build platform, nor is there any specific requirement for the construction of the drive. It can be moved by slider, lead screw, belt or other method. A suitable drive unit would be the Nema 17 stepper motor with 8 mm lead screw and a 1 mm pitch attached at right angles to the support plate that houses the visual display screen. The linear drive will either control the vertical motion of the screen or the platform.

The 3D printer comprises of an LCD display screen illuminated by a UV or visible light source. In the following examples the LCD screen used was a 5.7" 2160×3840 pixel LCD array in RGB format from BOE in Beijing, China with part number VS057QUM-NH2-62P0. It was back lit with a lensed LED array consisting of 38×3W LEDs with peak emission of 410 nm with each LED fitted with individual 12-degree angle of incidence collimating lenses on top of them. It is possible to use a UV or visible light source with the peak wavelength of between 350 nm to 700 nm, it is also possible for the LCD array to be back-lit by two arrays that can emit at different wavelengths to selectively harden two different polymers to deliver different properties to them.

The photopolymer, with or without the addition of particles (termed a slurry), is dispensed via a dispensing head which can deliver an even layer of material that is equal to or greater than the desired thickness of exposed layer. The dispensing head is equipped with a doctor blade or roller(s) to compress the material after its discharge and in the process deliver an even layer of the photopolymer or slurry.

After the dispensing head has discharged the photopolymer or slurry and compressed it to the required layer thickness, the visual display screen is brought into contact with it and the selective exposure of that layer is carried out. The platform is then moved away from the screen and the process is repeated.

Optionally, the dispensing layer can be delivered at a height of twice the layer thickness so that the voids created by the previous layer's exposure are filled in and the excess is carried over to the end. In this manner the abrasive material is effectively only dropped into the holes and not dragged across the screen protection layer or the built part.

The photopolymer can be of any type that will harden with light in the intensity and wavelength of the light source. The photopolymer can be a binder to hold ceramic or metal particles in a structure prior to subsequent sintering. The part will be subsequently drained of liquid polymer and washed in any suitable solvent. After cleaning, a post processing procedure involving blanket illumination of light, under water exposure or optionally at elevated temperature is carried out to fully harden the object and leave it dry to touch.

The photopolymer described in this invention can be cured either by a radical, or a cationic polymerisation mechanism, or a combination thereof. It can be a polyurethane, polycarbonate, epoxy based or any other form of chemistry. Said photopolymer formulation comprises: at least one monomeric or oligomeric chemical species comprising at least one carbon-carbon double bond that is polymerizable by free radical polymerisation. The oligomeric or monomeric species is present in a total amount of 10-95 wt %; alternatively, the monomeric or oligomeric species may contain a heterocylic species, preferably an oxygen containing heterocycle, polymerizable by cationic polymerization. The oligomeric or monomeric species is present in a total amount of 10-95 wt %. There is at least one photoinitiator that absorbs light in the region between 350-700 nm. The photoinitiator is present in 0.1-10 wt %; at least one co-initiator present in a total amount of 0.1-20 wt %. Optionally, the photopolymer formulation may contain a plurality of particles, a pigment or dye. Optionally, the photopolymer formulation may contain a dispersing or flow-modifying agent. It may be that the photopolymer formulation comprises at least one monomeric species, comprising at least one carbon-carbon double bond that is polymerisable by free radical polymerisation and at least one oligomeric species comprising at least one carbon-carbon double bond that is polymerizable by free radical polymerization. The monomeric species is present in a total amount of 10-95 wt %. It may be that the total amount of oligomeric species with at least one carbon-carbon double bond is between 20-85 wt %. It may be that the total amount of oligomeric species which is polymerisable by free radical polymerisation is between 35-80 wt %. It may be that the total amount of monomeric species which is polymerizable via radical polymerisation is between 40-65 wt %. It may be that the total amount of monomeric species comprising at least one carbon-carbon double bond is between 35-45 wt %. It may be that the photopolymer formulation comprises at least one aliphatic urethane acrylate monomer, it may be that the aliphatic urethane monomer comprises a single carbon-carbon double that can be polymerized by radical polymerization. Said aliphatic urethane monomer may comprise an acrylate or methacrylate group. Said aliphatic urethane monomer may be present in 10-95 wt %. It may be that the oligomeric species is an aliphatic urethane acrylate oligomer, which contains one, two or three acrylate groups, depending on the desired properties of the cured part. It may be that the photopolymer formulation contains an epoxy acrylate monomer with at least one carbon-carbon double bond that can be polymerized via a radical polymerization mechanism. It may be that the oligomeric species is an epoxy acrylate oligomer, which contains one, two or three acrylate groups, depending on the desired properties of the cured part. It may be that the urethane acrylate monomer is used in combination with the epoxy acrylate oligomer, comprising multiple carbon-carbon bonds. The urethane and epoxy acrylate monomers, comprising at least one carbon-carbon double and polymerisable via a radial polymerisation may be chosen from: nonyl phenol (4EO) acrylate, isobornyl acrylate (IBOA), phenoxyethyl acrylate (PEA), phenol (4EO) acrylate, o-phenylphenoxyethyl acrylate (OPPEOA), cyclic trimethylpropane formal acrylate (CTFA), tetrahydrofuryl acrylate (CTFA), 2-(2ethoxyethoxyl) ethyl acrylate (EOEOEA), octyl decyl acrylate (ODA), isodecyl acrylate (IDA), lauryl acrylate (LA), tripropyleneglycol monomethyl ethyl acrylate (TPGMEMA), hexanediol diacrylate (HDDA), bisphenol-A (4EO) diacrylate, polyethyleneglycol 200 diacrylate (PEG200DA), polyethylene glycol 300 diacrylate (PEG300DA), polyethyleneglycol 400 diacrylate (PEG400DA), polyethyleneglycol 600 diacrylate (PEG600DA), tripropyleneglycol diacrylate (TPGDA), 3-methyl-1,5-pentanediol diacrylate (MPDDA), neopnetylglycol (2PO) diacrylate (NPGPODA), dipropyleneglycol diacrylate (DPGDA), hexanediol (2EO) diacrylate (HD2EODA), hexanediol (2PO) diacrylate (HD2PODA), trimethylolpropane triacrylate (TMPTA), trimethylolpropane (3PO) triacrylate (TMP3POTA), glyceryl (4PO) triacrylate (GPTA), trimethylpropane (3EO) triacrylate (TMP3EOTA), trimethylpropane (9EO) triacrylate (TMP9EOTA), trimethylpropane (15EO) triacrylate (TMP15EOTA), tris(2-hydroxy ethyl) isocyanurate triacrylate (THEICTA), pentaerythriol tri and tetraacrylate, pentaerythritol (5EO) tatraacrylate (PPTTA), ditrimethylolpropane tetraacrylate (DiTMPTA), dipentaerythritol hexaacrylate (DPPA), dipentaerythritol hexaacrylate (DPHA), acrylated epoxy soya bean oil (ESBOA), bisphenol A epoxy diacrylate, caprolactone acrylate (CA), 3,3,5-trimethyl cyclohexyl acrylate (TMCHA), 4-tert-butylcyclohexyl acrylate (TBCHA), benzyl acrylate (BZA), tridecyl acrylate (TDA), isodecyl acrylate (IDA), phenol (2EO) acrylate, nonyl phenol (4EO) acrylate, nonyl phenol (8EO) acrylate, nonyl phenol (PO)2 acrylate ethoxy ethoxy ethyl acrylate (EOEOEA), stearyl acrylate 1,6-hexandiol (5EO) diacrylate, hydroxypivalic acid neopentyl glycol diacrylate, neopentylglycol (PO)2 diacrylate, dipropylene glycol diacrylate (DPGDA), triethylene glycol diacrylate (TEGDA), tricyclodecane dimethanol diacrylate (TCDDA), tetraethylene glycol diacrylate (TTEGDA), glycerine (PO)3 triacrylate (GPTA), pentaerythritol triacrylate (PETIA) and oligomers thereof. Triethylene glycol dimethacrylate (TEGDMA), diethylene glycol dimethacrylate (DEGDMA, trimethylolpropane trimethacrylate (TMPTMA), isobornyl methacrylate (IBOMA), polyethylene 200 di-methacrylate (PEG200DMA), polyethylene 400 di-methacrylate (PEG400DMA), polyethylene 600 di-methacrylate (PEG600DMA), bisphenol-A (2EO) dimethacrylate, bisphenol-A (4EO) dimethacrylate, bisphenol-A (3EO) dimethacrylate, bisphenol-A (10EO) dimethacrylate, bisphenol-A (30EO) dimethacrylate lauryl methacrylate (LMA), polypropylene glycol monomethacrylate (PPG5MMA), benzyl methacrylate, lauryl tetradecyl methacrylate, isodecyl methacrylate, phenoxymethyl methacrylate, stearyl methacrylate (SMA), methoxy PEG600 methacrylate, 1,6-hexanediol dimethacrylate (HDDMA), 1,4-butanediol dimethacrylate (BDDMA), neopentyl glycol dimethacrylate (NPGDMA), ethylene glycol diemthacrylate (EGDMA), diethylene glycol diemthacrylate (DEDGMA), 1,3-butylene glycol dimethacrylate, urethane dimethacrylate and oligomers thereof.

It may be that the formulation comprises at least one monomer with at least one heterocyclic moiety, preferably an oxygen containing moiety, that can be polymerised by a cationic polymerisation. The heterocyclic moiety may be an epoxide, an oxetane, a tetrahydrofuran, a tetrahydropyran, a lactone or a lactam. The monomeric species is present in a total amount of 20-90 wt %. It may be that the total amount of oligomeric species with at least one heterocyclic moiety is present at between 25-75 wt %. It may be that the total amount of oligomeric species which is polymerisable via a cationic polymerisation is between 35-70 wt %. It may be that the total amount of oligomeric species comprising at least one heterocyclic moiety is present in the formulation is 40-65%. It may be that the total amount of monomeric species which is polymerisable via a cationic polymerisation is between 20-90%. It may be that the total amount of monomeric species that can be polymerised via a cationic polymerisation is 20-60%. It may be that the total amount of monomeric species with at least one heterocyclic moiety is 25-45%.

The monomers and oligomers that are polymerisable via cationic polymerisation may be chosen from this list: allyl glycyl ether, bis[4-glycidyloxy)phenyl]methane, 1,3-butadiene diepoxide, 1,4-butanediol diglycidyl ether, butyl glycyl ether, tert-butyl glycidyl ether, 4-chlorophenyl glycidyl ether, cyclohexene oxide, cyclopentene oxide, dicyclopentene oxide, dicyclopentene dioxide, 1,2,5,6-diepoxycyclooctane, 1,2,7,8-diepoxyoctane, diglycidyl 1,2-cyclohexanedicarboxylate, N,N-diglycidyl-4-glycidyloxyaniline, 1,2-diepoxybutane, cis-2,3-epoxybutane, 3,4-epoxy-1-butene, 3,4-epoxycyclohexylmethyl 3,4-epoxycyclohexanecarboxylate, 1,2-epoxydodecane, 1,2-epoxyhexadecane, 1,2-epoxyhexane, 1,2-epoxy-5-hexene, 1,2-epoxy-2-methylpropane, exo-2,3-epoxynorbornane, 1,2-cyclooctane, 1,2-epoxypentane, 1,2-epoxy-3-phenoxypropane, (2,3-epoxypropyl) benzene, 1,2-epoxytetradecane, 2-ethylhexyl glycidyl ether, furfuryl glycidyl ether, glycerol diglycidyl ether, glycidyl hexadecyl ether, glycidyl isopropyl ether, glycidyl 4-methoxypohenyl ether, glycidyl 2-methylphenyl ether, isophorone oxide, 4,4'-methylenebis(N,N-diglycidylaniline), 2-methyl-2-vinyloxirane, neopentyl glycol diglycidyl ether, octyl glycidyl ether, decyl glycidyl ether, α-pinene oxide, propylene-oxide, resorcinol diglycidyl ether, styrene oxide, tris(2,3-epoxypropyl) isocyanuarate, tris(4-hydroxyphenyl)methyl triglycidyl, 1,2-butylene oxide, 2,2'-{[(propane-2,2-diyl bis(cyclohexane-1,3-diyl))bis(oxy)] bis(methylene)] bis(oxyrane)}, 3-oxetanone, 3-bromooxetane, 3-iodooxentane, trimethylene oxide, 3-hydroxyoxetane, 3-aminooxetane, β-butyrolactone, oxetane-3-carboxylic acid, 3-aminooxetane-3-carboxylic acid, oxetane-3-methanol, 3-(aminomethyl) oxetane, 3-amino-3-methyloxetane, N-methyl-3-aminooxetane, 2-(3-oextanylidine) acetonitrile, 3-methyl-3-oxetanecarboxaldehyde, 3-methyloxetane-3-carboxylic acid, 3-bromomomethyl-3-methyloxetane, 3,3-diemtheyloxetane, 3-methyl-3-oxetanemethanol, 1-(3-methyloxetan-3-yl)methanamine, 3-ethyl-3-oxetanemethanol, 3-(phenoxymethyl)-3-oxetanylamine and oligomers thereof.

It may be that the photoinitiator, which absorbs light in the region between 350-700 nm is present at between 0.5-10 wt %. Said photoinitiator may be an organometallic species such as a titanocene species selected from: bis($\eta^5$-2,4-cylopendien-1-yl)bis[2,6-difluoro-3-(1H-pyrrol-1-yl)phenyl]titanium (IV), titanocene bis(trifluoromethanesulfonate), titanocene dichloride, (indenyl) titanium (IV) trichloride, (pentamethylcyclopentadienyl) titanium (IV) trichloride, cyclopentadienyltitanium (IV) trichloride, bis(cyclopentadienyl) titanium (IV) pentasulfide, (4R, 5R)-chloro-cylopentadienyl-[2,2-dimethyl-1,3-dioxalan-4,5-bis(diphenylmethoxy)]titanium (IV), (4R, 5S)-chloro-cylopentadienyl-[2,2-dimethyl-1,3-dioxalan-4,5-bis(diphenylmethoxy)]titanium (IV) and mixtures thereof. Preferably the titanocene is bis($\eta^5$-2,4-cyclopentadien-1-yl)-bis(2,6-difluoro-3-(1H-pyrrol-1-yl)-phenyl) titanium (IV). The photoinitiator may be camphorquinone or a camphorquinone derivative. The photoinitiator may be further selected from: 1-amino-4-anilinoanthraquinone, 1,4-bis(p-tolylamino)anthraquinone, 1,4-bis(pentylamino)anthraquinone, 1-amino-4-hydroxyanthraquinone, 1,4-diaminoanthraquinone, 1,5-diaminoanthraquinone, tetraphenylporphyrin, tetra-o-tolylporphyrin, tetrakis(2,6-dimethylphenyl)porphyrin, tetramesitylporphyrin, tetrakis(2,6-diisopropylphenyl)porphyrin, tetrakis(2-chlorophenyl)porphyrin, tetrakis(2-bromophenyl)porphyrin, tetra(naphthalen-2-yl)porphyrin, zinc tetraphenylporphyrin, zinc tetra-o-tolylporphyrin, zinc tetrakis(2,6-dimethylphenyl)porphyrin, zinc tetramesitylporphyrin, zinc tetrakis(2,6-diisopropylphenyl)porphyrin, zinc tetrakis(2-chlorophenyl)porphyrin, zinc tetrakis(2-bromophenyl)porphyrin, zinc tetra(naphthalen-2-yl)porphyrin, eosin Y, 2-octanoyl-4,5,7-triiodo-3-hydroxy-6-fluorone, 9-cyano-2-octanoyl-4,5,7-triido-3-hydroxy-6-fluorone, 2-octyl-4,5,7-triido-3-hydroxy-6-fluorone, 9-cyano-2-octyl-4,5,7-triido-3-hydroxy-6-fluorone, 3,3-[(dimethyl-1-propylindolin-2-ylidene)penta-1,3-dien-1-yl]-1,1-diemthyl-3-pentyl-1H-benzoindol-3-ium butyltriphenylborate, 1,3-[(dibutyl-3,3-dimethylindolin-2-ylidene)penta-1,3-dien-1-yl]-1,1-diemthyl-1H-benzoindol-3-ium butyltriphenylborate, {[(2-chloro-1,3,3-trimethyl-2-ylidene)ethylidene]cyclohe-1-en-1-yl}vinyl-1,3,3-trimethyl-1H-benzoindol-3-ium butyltriphenylborate, [2-chloro-(1,3,3-trimethyl-1,3-dihydro-2H-benzoindole-2-ylidene)cyclohex-1-en-1-yl]vinyl-1,3,3-trimethyl-1H-benzoindol-3-ium.

It may be that the photopolymer formulation contains a co-initiator. It may be that said co-initiator is present in a total amount of 2-10 wt %. It may be that the total amount of co-initiator present is 2-5 wt %. The co-initiator may be selected from a family of organic thiols with the formula $(XSY)_n$, where X is an organic moiety, Y is either a hydrogen atom, or an organic moiety and n is between 1-4. These will be referred to as thiols herein. The thiol may be selected from: 2-mercaptobenzoxazole, 2-mercaptobenzothiazole, 2-mercaptobenzimidazole, pentaerythritol tetrakis (mercaptoacetate), 4-acetamidothiophenol, mercaptosuccinic acid, dodecathiol, β-mercaptoethanol, 6-ethoxy-2-mercaptobenzathiazole, 4-methyl-4H-1,2,4-triazole-3-thiol, 2-mercapto-1-methylimidazole, 2-mercapto-5-1,3,4-thiadiazole, 5-N-butylthio-2-mercapto-1,3,4-thiadiazole, 4-methoxybenzene thiol, 2-phenyl-1H-tetrazole-5-thiol, 4-phenyl-4H-1,2,4-triazole-3-thiol, pentaerythriol tetrakis (3-mercaptopropionate), trimethylolpropane-tris(mercaptoacetate), 2-mercaptopyridine, 4-mercaptopyridine, 2-mercapto-3H-quinazoline and 2-mercaptothiazoline, or a mixture thereof. The co-initiator may be selected from a family of organic amines with the formula $X(NYR)_n$, where X is an organic moiety, Y and R are either a hydrogen atom or an organic moiety and n is between 1-4. These are referred to amines herein. The amine may be selected from: allylamine, 2,2-bis(aminoethoxy)propane, 4-chloro-o-phenylenediamine, 1,3-cyclohexanebis(methylamine), 1,3-diaminoacetone, 1,4-diaminoanthraquinone, aniline, 1,5-diamino-methylpentane, 1,9-diaminononane, 2,4-diaminotoluene, 2,6-diaminotoluene, diaminoethane, 1,3-diaminopropane, iso-propyl diamine, 2,2'-(ethylenedioxy)bis(ethylamine), 4,4'-methylenebis(2,6-diethylaniline), 3,3'-methylenedianiline, triethanolamine, triethylamine, tris(2-aminoethyl)amine, N,N'-diisopropylethylenediamine, N,N'-diisopropyl-1,3-propanediamine, N,N'-dimethyl-1,3-propanediamine, 4,4'-bis(diethylamino)benzophenone, 4-(diethylamino)benzophenone, 2-(diethylamino)ethyl acrylate, 2-(diethylamino)ethyl methacrylate, 3-(dimethylamino)propyl acrylate, ethyl 4-(dimethylamino)benzoate, 2-dimethylamino-ethylbenzoate, isoamyl-4-(dimethylamino)benzoate, 2-ethylhexyl 4-(dimethylaminobenzoate) and Michler's ketone. The co-initiator may be selected from a family of organic triazine 1,3,5-triazines with a $CX_3$, or an Ar—$CX_3$ substituent, where X is a halogen atom selected among Cl, Br, I, preferably a chlorine and Ar is an aromatic, or heteroaromatic substituent. The triazine co-initiator may be selected from: 2-phenyl-4,6-bis(trichloromethyl)-s-triazine, 2,4,6-tris(trichloromethyl)-s-triazine, 2-(p-methoxystyryl)-4,6-bis(trichloromethyl)-s-triazine, 2-(styryl-4,6-bis(trichloromethyl)s-triazine, 2-(p-methoxystyryl)-4,6-bis(trichloromethyl)-s-triazine, 2-(4-methoxy-naphtho-y-yl)-4,6-bis(trichloromethyl)-s-triazine and 2-[4-(2-thoxyethyl)-naphtho-1-yl]-4,6-bis(trichloromethyl)-s-triazine. The 'organic moiety X' can be a hydrocarbyl group, or a group of hydrocarbyl groups with or without heteroatoms. The hydrocarbyl group may be selected from: alkyl group, cyclohexyl group, cyclopentyl group, benzyl group, aromatic group, polyaromatic group, heteroaromatic group. Any of these groups can be substituted, or linked by an aldehyde group, a halogen atom, nitrogen atom, a sulphur atom, a ketone group, a carboxylate group, an ester group, an ether group, a thioether group, an amine group, or an amide group. The co-initiator may be selected from the family of organic, aromatic or heteroaromatic iodonium salts: bis(2,4,6-trimethylpyridine)iodonium hexaflurophosphate, bis(4-tert-butylphenyl)iodonium hexafluorophosphate, bis(pyridine)iodonium hexafluorophosphate, bis(pyridine)iodonium tetrafluoroborate, bis(4-bromophenyl)iodonium trifluoromethansulfonate, bis(2,4,6-trimethylphenyl)iodonium trifluoromethansulfonate, [4-(bromomethyl)phenyl](2,4,6-trimethoxyphenyl)iodonium-p-toluenesulfonate, bis(4-fluorophenyl)iodonium trifluoromethansulfonate, (3-bromophenyl)(mesityl)iodonium trifluoromethansulfonate, 4-biphenylyl(2,4,6-trimethoxyphenyl)iodonium trifluoromethansulfonate, diphenyliodonium hexafluorophosphate, diphenyliodonium perchlorate, diphenyliodonium hexafluoroarsenate, diphenyliodonium trifluoromethansulfonate, diphenyliodonium chloride, diphenyliodonium nitrate, diphenyliodonium bromide, diphenyliodonium iodide, diphenyliodonium-2-carboxylate monohydrate, (3,5-dichlorophenyl)(2,4,6- trimethoxyphenyl)iodonium p-toluenesulfonate, ethyl (phenyl)iodonium tetrafluoroborate, (5-fluoro-2-nitrophenyl)(2,4,6-trimethoxyphenyl)iodonium p-toluenesulfonate, [4-fluoro-3-(trifluoromethyl)phenyl](2,4,6-trimethoxyphenyl)iodonium p-toluenesulfonate, 4-iso-propyl-4'-methyldiphenyliodonium tetrakis(pentafluorophenyl)borate, (2-methylphenyl)(2,4,6-trimethylphenyl) iodonium trifluoromethanesulfonate, (3-methylphenyl)(2,4,6-trimethylphenyl) iodonium trifluoromethansulfonate, (4-methylphenyl)(2,4,6-trimethylphenyl)iodonium trifluoromethansulfonate, (4-nitrophenyl)iodonium trifluoromethansulfonate, (perfluorohexyl)phenyliodonium trifluoromethansulfonate, (perfluoro-n-octyl)phenyliodonium trifluoromethansulfonate, (perfluoropropyl)phenyliodonium trifluoromethansulfonate, trimethylsilylethynyl(phenyl)iodonium tetrafluoroborate, phenyl[2-(trimethylsilyl)phenyl] iodonium trifluoromethanesulfonate, phenyl(2,4,6-trimethoxyphenyl)iodonium p-toluenesulfonate and phenyl [3-(trifluoromethyl)phenyl)iodonium trifluoromethanesulfonate.

The formulation may further contain a plurality of particles. Said particles may be sand, or sand and a glass binder. The particles may be a ceramic, or metal or a combination of a ceramic and a metal. Said particles may be surface treated. The particles may be a wax, or a combination of waxes, polymer or rubber particles. The formulation may comprise an organic, or inorganic pigment, a dye, or a combination thereof. The formulation may comprise a dispersing or flow modifying agent. Subsequently these objects may be placed in an oven to allow the debinding of the organic polymer and the sintering of the particles.

The visual display screen or emissive pixel array may be of a number of types; Liquid Crystal Display (LCD), Light emitting Diode (LED), Electronic paper (E Ink), Electroluminescent display (ELD), Plasma Display Panel (PDP) or Organic Light-emitting Diode Display (OLED). This list is not limiting in its scope in terms of the invention and indeed any device which emits digitally controllable light can be used in this invention, the preferred choice of visual display screen however is LCD in format. For simplicity the term LCD screen is used to refer to the visual display screen used in a non-limiting manner afterwards.

An LCD typically consists of an array of pixels. Each pixel consists of a layer of liquid crystal molecules aligned between two transparent electrodes and two polarizing filters (parallel and perpendicular), the axes of transmission of which are, in most of the cases, perpendicular to each other. Before an electric field is applied, the orientation of the liquid crystal molecules is commonly twisted, the surface alignment directions at the two electrodes are perpendicular to each other and so the molecules arrange themselves in a helical structure. By controlling the voltage applied across the liquid crystal layer in each pixel, light can be allowed to pass through in varying amounts thus creating different levels of light transmission.

It may be that the visual display screen has 150 pixels per inch or greater. It may be that the visual display screen has 250 pixels per inch or greater. It may be that the visual display screen has 500 pixels per inch or greater. It may be that the visual display screen has a ratio of its contrast ratio to its luminescence that is above 1.0. The length of time that the screen illuminates the image is determined by two factors; the rate of curing of the photopolymer and the intensity of light being emitted from the screen thus curing it. It is therefore desirable to reduce the exposure time by increasing the intensity of the light transferred through the array.

In some cases, this type of visual display screen 3D printer utilises the screen as it was intended, but in most cases the 3D printer manufacturer removes the backlight and rear panel and lights it directly from behind the array. In this case the LCD screen assembly has its LED backlight which generated visible light from 400 nm to 700 nm replaced with LEDs directly behind the array emitting light that is as collimated as possible. This in effect uses the LCD nematics as an array of individually controllable masks to either untwist and allow the light through or remain twisted to prevent it. The screens can be monochrome or colour and composed of sets of blue, green and red subpixels or other colours. The intensity can be much brighter than would be intended for human viewing where typically 350-500 nits (candela/m$^2$) is used for normally lit environments and 800-1000 nits is used for sunlit ones, in practice there is no limit to light emitted from the array, it being dependent upon the power of the lighting array behind it, the loss in contrast ratio as the intensity is increased and the maximum tolerable level of heat or UV for the screen or the resin. LCD screens are reliable and if lit at the correct wavelength, intensity and in the absence of significant heat generation, are very long lasting, generating reliable images for over 30,000 hours, far longer than lasers or DLPs.

Figure 1:
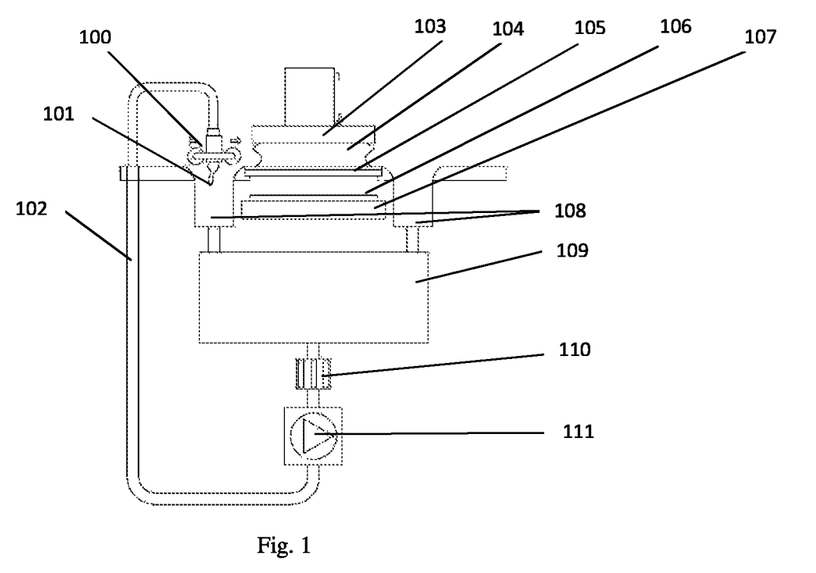
FIG. 1 describes an apparatus with a single movable dispensing head that discharges photopolymer or a photopolymer and particle mix (slurry) as it moves across the area to be exposed.

FIG. 1 describes the apparatus with a single movable dispensing head (100) that discharges photopolymer or a photopolymer and particle mix (slurry) (101) as it moves across the area to be exposed. The movable dispensing head is fed by a discharge pipe (102) and has two rollers to compress the material and leave an even layer of the desired thickness. It can move in either direction above the visual display screen. Parts (104) are constructed on a print platform (103).

The printer has two catch pots (108) (for example resin catch pots) to allow the excess dispensed material to be collected. It also allows a continuous flow to be maintained to ensure that any particles in the slurry are evenly distributed. Dispensed material is laid down evenly at the desired thickness (105) before exposure via a visual display screen (106) illuminated by a light source (107). The excess material is captured and flows into the fluid chamber (109) and is forced back to the dispensing head via a pump (111). The pump may be a peristaltic pump 504U made by Watson Marlow with Verdaflex tubing connecting it to the dispensing heads. Dispensing of the resin may be directed via a filter (110). In all the following examples the LCD screen (106) used was a 5.7" 2160×3840 pixel LCD array in RGB format from BOE in Beijing, China with part number VS057QUM-NH2-62P0. It was back lit with a lensed LED array (107) consisting of 38×3W LEDs with peak emission of 410 nm and fitted with individual 12-degree angle of incidence collimating lenses on top of each one. It is possible to use any suitable UV or visible light source with the wavelength from 350 nm to 700 nm. It is possible to have two different light sources behind the same LCD screen which in turn can illuminate two different photopolymers.

In this example the catch pots (108) are separated from, or spaced laterally from, the print platform (103) (and similarly the visual display screen (106))—for example in a position to the side of the print platform (103) and/or the visual display screen (106). That is, the catch pots (108) allow the excess dispensed material to be collected away from the part (104) being constructed. As such, the part (104) is kept separate from the resin supply during construction (i.e. during exposure) rather than being housed a resin vat.

Figure 2:
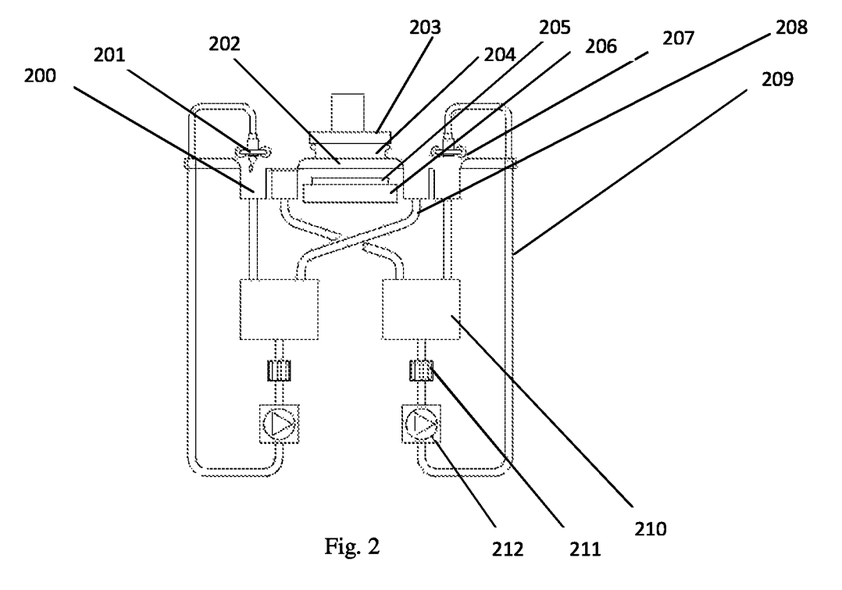
FIG. 2 describes an apparatus where the dispensing head discharges photopolymer or a photopolymer and particle mix (slurry).

FIG. 2 describes the apparatus where the dispensing head discharges photopolymer or a photopolymer and particle mix (slurry). In this example there are two dispensing heads (201) and (207), which can dispense two different photopolymers or slurries with contrasting properties, for instance one can be flexible and one tough, or alternatively one soluble/weak for support material or one durable for the object part. Each dispensing head is fed by a discharge pipe (209) and it has two rollers to compress the material and leave an even layer behind of the desired thickness. Here the printer has a resin catch pot (200) which allows the excess material to be collected. Dispensed material is laid down evenly at the desired thickness (202) before exposure via a visual display screen (205) illuminated via a light source (206).

The excess material is captured and flows down a return pipe (208) before entering the fluid chamber (210) and is pumped back to the dispensing head via a pump (212). Exemplary pumps are peristaltic pump 504U made by Watson Marlow with Verdaflex tubing connecting it to the dispensing heads. The resin may be subsequently filtered (211). In all the following examples the LCD screen used was a 5.7" 2160×3840 pixel LCD array in RGB format from BOE in Beijing, China with part number VS057QUM-NH2-62P0. It was back lit with a lensed LED array consisting of 38×3W LEDs with peak emission of 410 nm and fitted with individual 12-degree angle of incidence collimating lenses on top of each one. In is possible to use any suitable UV or visible light source with the wavelength from 350 nm to 700 nm. It is possible to have two different light sources behind the same LCD screen which can illuminate the two different photopolymers. It is possible to have three or more dispensing heads in this configuration.

Figure 3:
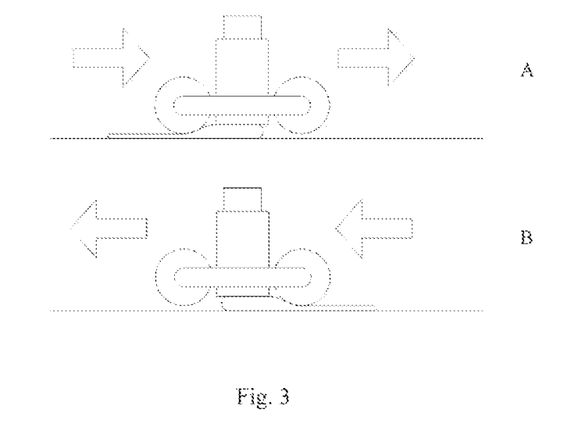
FIG. 3 describes a mechanism by which the dispensing head delivers the photopolymer.

FIG. 3 describes the mechanism that the dispensing head delivers the photopolymer with. In example A the direction of travel is from left to right and in example B it reverses, the ability to discharge in both directions improves printing efficiency.

Figure 4:
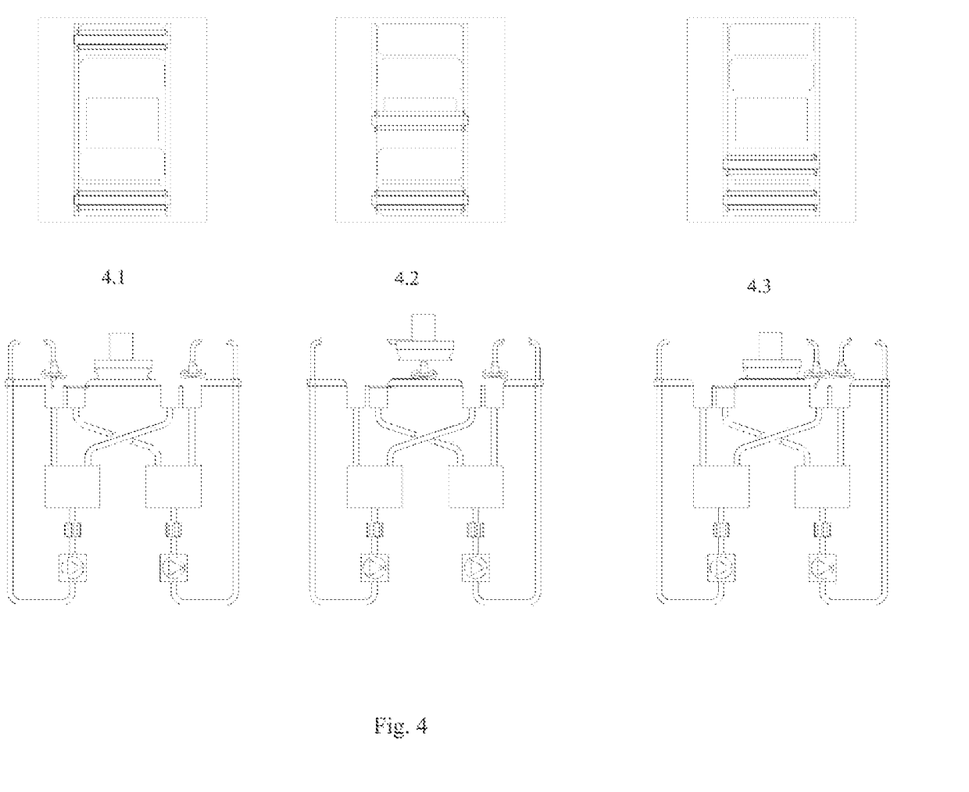
FIG. 4 describes an operation of a two head polymer or polymer slurry dispensing system.

FIG. 4 describes the operation of a two head polymer or polymer slurry dispensing system. In 4.1 the first head on the left starts to dispense with the second head on right, static. In 4.2 the screen has been elevated to allow the head to pass under it and it has reached the mid-point discharging a layer that fills in the gaps in the 100 micron layer below. In 4.3 the head has reached its final destination on the right side and is now discharging into the resin catch pot with the screen lowered to expose the recently delivered layer.

In some examples the dispensing heads operate continuously during the printing and motion steps. That is, the system operates continuously, with material continuously pumped and deposited from the dispensing heads with the catch pots catching and recycling excess material during use. In other examples, the flow of material from the dispensing heads may be shut off (for example by a physical shutter or through use of negative pressure) to stop the flow of material/slurry from the dispensing head at the end of each pass. The flow of material may then be restarted at the beginning of the next pass.

Figure 5:
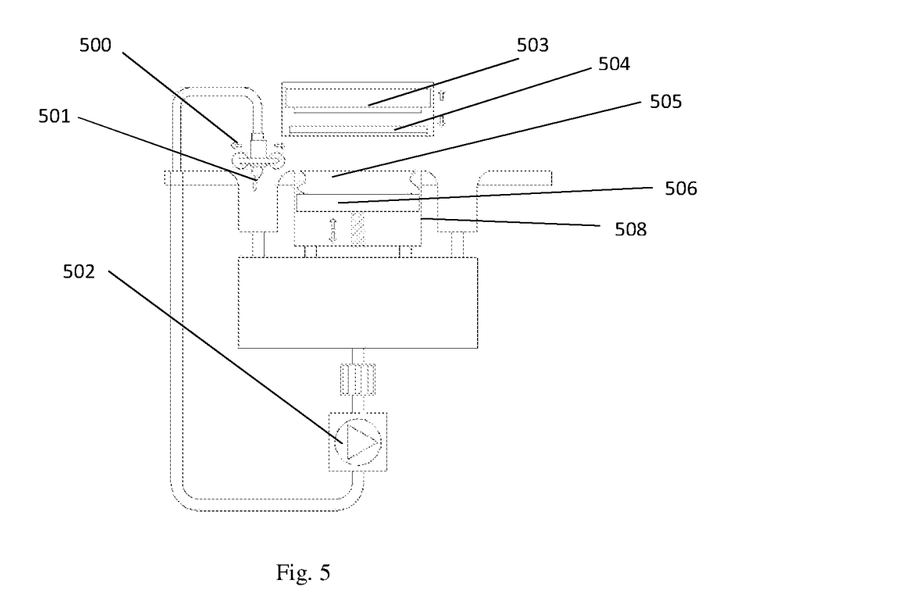
FIG. 5 describes a one dispensing system process shown in FIG. 1, but reversed with the screen at the top and the build platform moving downwards away from the screen.

FIG. 5 describes the one dispensing system process shown in FIG. 1, but reversed with the screen at the top and the build platform moving downwards away from it. In this orientation the dispensing head (500) moves from left to right over the object (505) being built on the build platform (506) by being illuminated from light through the LCD screen (504) illuminated from the backlight unit (503). As before the polymer or polymer slurry (501) is pumped in a closed system by the pump (502).

In this scenario the print platform (506) descends after each layer has been exposed, by the distance of the exposed layer. The print platform moves downwards into an open topped container (508), the depth of which defines the maximum possible build height. Preferably the platform makes a seal with the container around its perimeter. An advantage of this process is that the exposed and non-exposed slurry and/or additional material delivered by a secondary mechanism, are supported during the printing process by their containment within the walls of the container. A further advantage of this system is that the selective dispensing by robocasting, FDM or inkjet can take place on the platform (in the case of the first layer) or on the entire upper surface of the last printed layer (in the case of subsequent layers). This orientation enables the conventional operation of robocasting, inkjet or FDM heads to be orientated downwards to create printed parts of a different material. After completion of the selective delivery by a secondary mechanism the entire surface can be covered with a non-selectively deposited slurry. The visual display screen can then be lowered to come into close proximity with the slurry and selectively expose the entire area of it. The uncured material present within the container can be subsequently recycled. In this example, the uncured material is recycled by draining the container into the fluid chamber. As such, the uncured material can be pumped back to the dispensing head by the pump (502) as part of the closed system.

Figure 6:
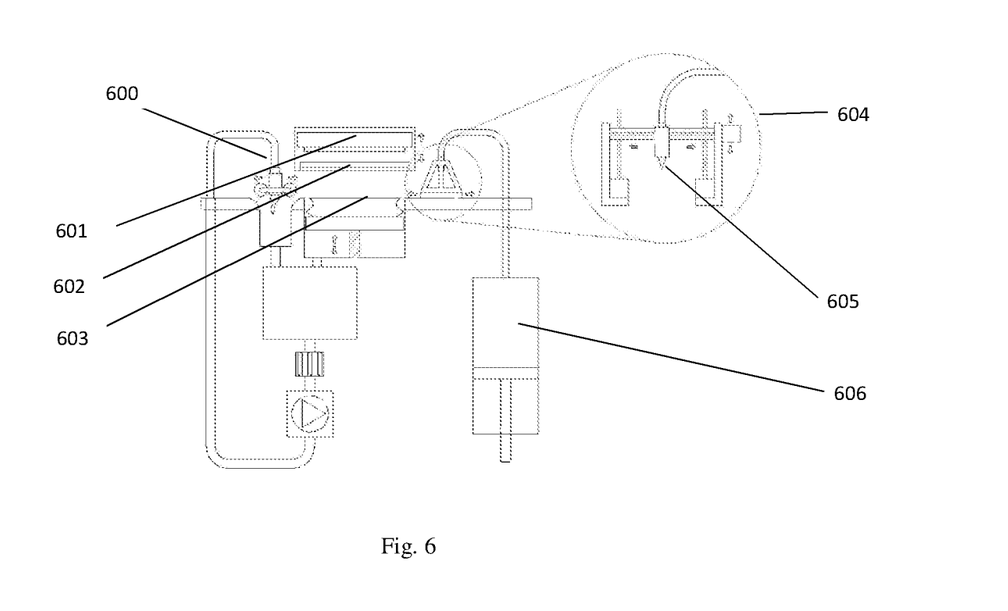
FIG. 6 describes a setup where a polymer or polymer slurry dispensing head is combined with a robocasting head.

FIG. 6 describes the setup where the polymer or polymer slurry dispensing head (600) is combined with a robocasting head (604). Here a pass from the photopolymer head discharges material (603) onto the build platform having been selectively exposed by light emitted through an LCD screen (602) illuminated by a backlight (601). The robocasting cylinder (606) dispenses a second material through the tip (605) and this makes a pass selectively dispensing material alternating its cycle with the polymer dispensing head.

Figure 7:
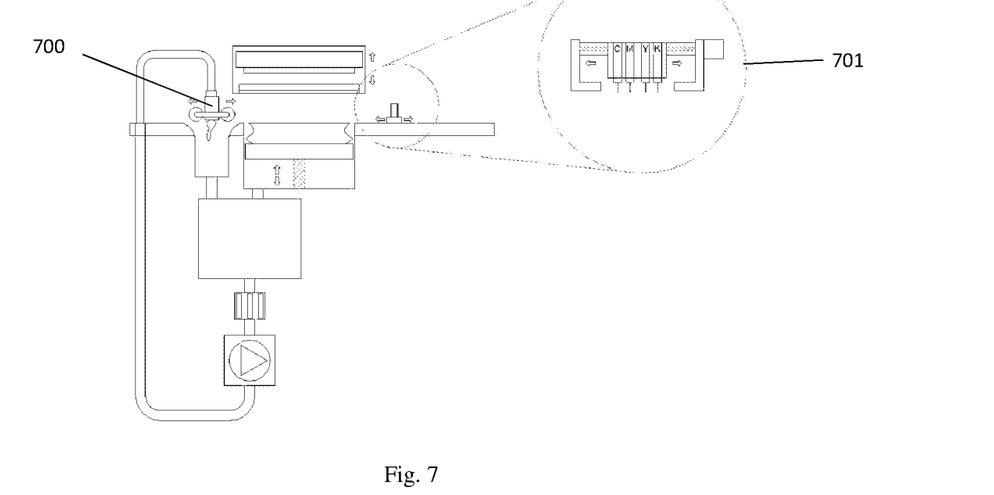
FIG. 7 describes a setup where the polymer or polymer slurry dispensing head according to embodiments described herein is combined with an inkjet head.

FIG. 7 describes the setup where the polymer or polymer slurry dispensing head as described in previous examples (700) is combined with an inkjet head (701). Here the ink jet head can lay a material of differing properties down on top of the cured polymer/slurry. These properties could be conductive to electricity, whereas the polymer/ceramic slurry is insulating for instance. As with the previous example with a robocasting cylinder, here the two heads make alternating passes over the exposure bed.

Figure 8:
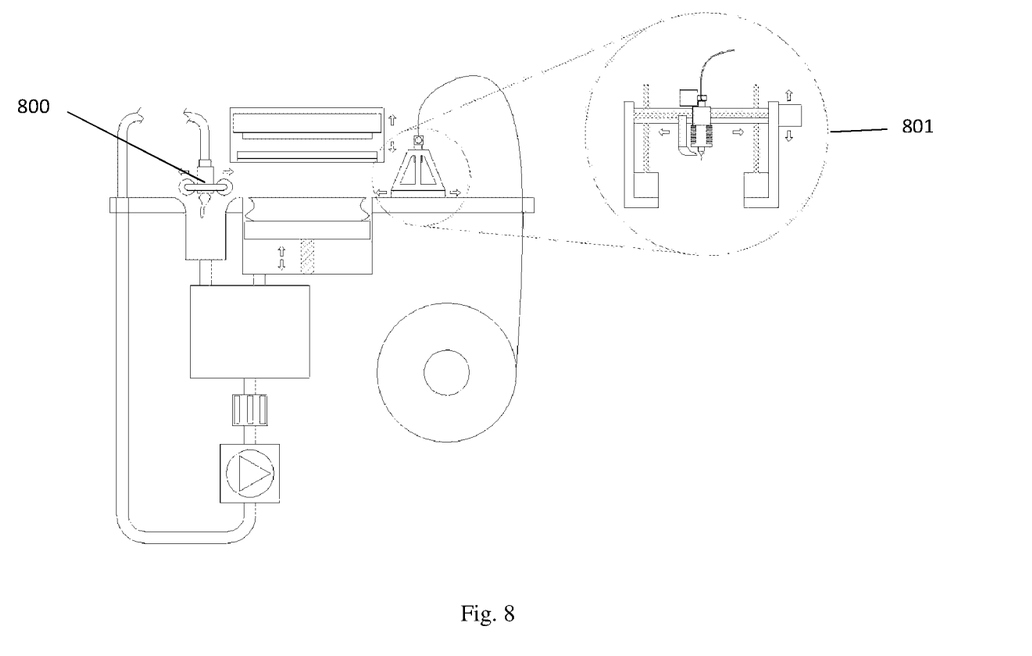
FIG. 8 describes the setup where a polymer or polymer slurry dispensing head is combined with a fused deposition modelling (FDM) head.

FIG. 8 describes the setup where the polymer or polymer slurry dispensing head (800) is combined with an fused deposition modelling (FDM) head (801). Once an even distribution of the photocurable material has been delivered, the LCD screen selectively illuminates it and then lifts out of the way so the build platform can lower by one layer and the thermoplastic extrusion hotend of the FDM assembly can discharge over it. The FDM material is fed into the hotend using a precision motor assembly enabling it to deposit liquid thermoplastic in the desired locations. The hot thermoplastic can be air cooled and solidified using a fan.

EXAMPLES

Example 1

In this example 560 grams of photopolymer formulation were prepared by mixing urethane dimethacrylate (UDMA, Ebecryl 4859, Allnex), 33.5 wt %, triethylene glycol dimethacrylate (TEGDMA, M233, Miwon), 35 wt %, 2-[[(butylamino)carbonyl]oxy]ethyl acrylate (Photomer 4184, IGM), 30 wt % in a black plastic bottle. The colourless reaction mixture was stirred for 30 minutes at room temperature. Then, 1-dodecathiol (Sigma Aldrich), 1 wt % and Irgacure 784 bis($\eta^5$-2,4-cyclopentadien-1-yl)-bis(2,6-difluoro-3-(1H-pyrrol-1-yl)-phenyl) titanium (IV) (Sigma Aldrich), 0.5 wt % were added and the resulting reaction mixture was sonicated for 60 minutes until all solids dissolved. The 3D test object was created using the setup described in FIG. 1, where the discharge head (100) dispenses one layer of resin at the time compressing it using rollers, in this case it dispensed at 100 microns above the base layer with a 100 micron discharge so that only those elements that were removed on the previous exposure were refilled.

The test object was built by dispensing one layer at the time and then illuminating that layer to selective light emitted through the LCD array (106), before the next layer is dispensed on top of it. All layers were created using the photopolymer formulation described in Example 1. This system uses visible light with a wavelength of 460 nm to induce a radical photopolymerization process. After completion of the 3D printing process, the finished object is removed from the printing platform, washed and post exposed under UV light for 120 minutes. A solid object representing the digital image was satisfactorily created.

Example 2

In this example 780 grams of photopolymer resin were prepared by mixing 1,6-hexanediol diacrylate (HDDA, Miramer M200, Miwon), 30 wt %, trimethylolpropane triacrylate (TMPTA, Miramer M300, Miwon), 47.5 wt %, isobornyl acrylate (IBOA, Miramer M1140, Miwon), 15 wt %, Miramer PU 3280NT (Miwon), 5 wt % and Genomer 7302 (Rahn), 1 wt % in a black bottle. The colourless reaction mixture was stirred for 30 minutes at room temperature. Then, bis($\eta^5$-2,4-cyclopentadien-1-yl)-bis-(2,6-difluoro-3-(1H-pyrrol-1-yl)-phenyl) titanium (IV) (Sigma Aldrich), 0.5 wt % was added and the reaction mixture was sonicated for 60 minutes at room temperature until all solids were dissolved. Subsequently, GemSperse Black Ex/V2 (Dominion Colour Corp.), 1 wt % was added to the reaction mixture and the resulting black reaction mixture was stirred for 30 minutes at room temperature. The 3D test object was created using the setup described in FIG. 1, which dispenses one layer of resin at the time using a dispensing head. The test object in FIG. 1 comprises 200 layers with a layer thickness of 100 microns each. These were created by dispensing one layer at the time and illuminating the layer, before the next layer is dispensed on top of the first layer. All layers were created using the photopolymer formulation described in Example 2. This system uses visible light with a wavelength of 460 nm to induce a radical photopolymerization process. After completion of the 3D printing process, the finished object is removed from the printing platform, washed and post exposed under UV light for 120 minutes. A solid object representing the digital image was satisfactorily created.

Example 3

In this example 920 grams of photopolymer formulation were prepared by mixing tricyclodecane dimethanol diacrylate (TCDDA, Miramer M262, Miwon), 17.5 wt %, trimethylolpropane triacrylate (TMPTA, Miramer M300, Miwon), 25 wt %, 2-[[(butylamino)carbonyl]oxy]ethyl acrylate (Photomer Ph4184, IGM), 25 wt %, 1,6-hexanediol diacrylate (HDDA, Miramer M200, Miwon), 30 wt % and Genomer 7302 (Rahn), 1.5 wt % in a black plastic bottle. The colourless reaction mixture was stirred for 60 minutes at room temperature. Then, bis($\eta^5$-2,4-cyclopentadien-1-yl)-bis-(2,6-difluoro-3-(1H-pyrrol-1-yl)-phenyl) titanium (IV) (Sigma Aldrich), 1 wt % and the resulting reaction mixture was sonicated for 60 minutes, then heated to 60° C. for 18 hours with occasional stirring until all solids dissolved. Subsequently, COD0008 white titanium dioxide (Sun Chemicals), 3 wt % was added and the white reaction mixture was stirred for 45 minutes. The 3D test object was created using the setup described in FIG. 1, which dispenses one layer of resin at the time using a dispensing head. The test object in FIG. 1 comprises 200 layers with a layer thickness of 100 microns each. These were created by dispensing one layer at the time and illuminating the layer, before the next layer is dispensed on top of the first layer. All layers were created using the photopolymer formulation described in Example 3. This system uses visible light with a wavelength of 460 nm to induce a radical photopolymerization process. After completion of the 3D printing process, the finished object is removed from the printing platform, washed and post exposed under UV light for 120 minutes. A solid object representing the digital image was satisfactorily created.

Example 4

In this example 450 grams of photopolymer formulation were prepared by mixing urethane dimethacrylate (UDMA, Ebecryl 4859, Allnex), 20 wt %, Lauryl acrylate (LA, Miramer M120, Miwon) 57 wt %, isobornyl acrylate (IBOA, Miramer M1140, Miwon), 16 wt % and triethanolamine (Sigma Aldrich), 5 wt % were mixed in a black plastic bottle. The clear reaction mixture was stirred for 30 minutes. Then, zinc tetraphenylporphyrin (ZnTpp) (Sigma Aldrich), 2 wt % was added and the reaction mixture was heated to 60° C. for 18 hours with occasional stirring until all solids dissolved. Subsequently, SWD 4733 Blue Al Lake Pigment (Sun Chemicals) was added to the reaction mixture and the resulting blue reaction mixture was stirred for 30 minutes. The 3D test object was created using the setup described in FIG. 1, which dispenses one layer of resin at the time using a dispensing head. The test object in FIG. 1 comprises 250 layers with a layer thickness of 100 microns each. These were created by dispensing one layer at the time and illuminating the layer, before the next layer is dispensed on top of the first layer. All layers were created using the photopolymer formulation described in Example 4. This system uses visible light with a wavelength of 635 nm to induce a radical photopolymerization process. After completion of the 3D printing process, the finished object is removed from the printing platform, washed and post exposed under UV light for 120 minutes. A solid object representing the digital image was satisfactorily created.

Example 5

In this example, 550 grams of photopolymer formulation were prepared by mixing trimethylolpropane triacrylate (TMPTA, Miramer M300, Miwon), 40 wt %, 1,6-hexanediol diacrylate (HDDA, Miramer M200, Miwon), 30 wt % and triethylamine (Sigma Aldrich), 7 wt % were mixed in a metal tin. Then, Cerasphere UV 636 (Shamrock), 10 wt % and Cerasperse 174 (Shamrock), 10 wt % particles were added using a Dissolver Dispermat CN10 (VMA-Getzmann GmbH) high shear mixer and shear speeds of 4000 rpm in order to obtain a homogeneous dispersion of particles in the photopolymer resin. Subsequently, zinc tetraphenylporphyrin (ZnTpp) (Sigma Aldrich), 3 wt % was added and the reaction mixture was heated to 60° C. for 24 hours with occasional stirring until all solids dissolved. The 3D test object was created using the setup described in FIG. 1, which dispenses one layer of resin at the time using a dispensing head. The test object in FIG. 1 comprises 150 layers with a layer thickness of 100 microns each. These were created by dispensing one layer at the time and illuminating the layer, before the next layer is dispensed on top of the first layer. All layers were created using the photopolymer formulation described in Example 5. This system uses visible light with a wavelength of 635 nm to induce a radical photopolymerization process. After completion of the 3D printing process, the finished object is removed from the printing platform, washed and post exposed under UV light for 120 minutes. A solid object representing the digital image was satisfactorily created.

Example 6

In this example 650 grams of resin were prepared by mixing 1,6 hexanediol diacrylate (HDDA, Miramer M200, Miwon), 10 wt %, trimethylolpropane triacrylate (TMPTA, Miramer M300, Miwon), 1 wt %, Disparlon NS-5500 (Kingsindustries), 0.3 wt % and oleic acid (Sigma Aldrich), 0.35 wt % were mixed in a metal tin. The clear reaction mixture was mixed for 30 minutes at room temperature. Then, 17-4 PH stainless steel (Sandvik), 88 wt % particles were added using a Dissolver Dispermat CN10 (VMA-Getzmann GmbH) high shear mixer and shear speeds of 4000 rpm in order to obtain a homogeneous dispersion of particles in the photopolymer resin. Subsequently, bis($\eta^5$-2,4-cyclopentadien-1-yl)-bis-(2,6-difluoro-3-(1H-pyrrol-1-yl)-phenyl) titanium (IV) (Sigma Aldrich), 0.2 wt % was added and the reaction mixture was heated to 60° C. for 24 hours with occasional stirring until all solids dissolved. The 3D test object was created using the setup described in FIG. 1, which dispenses one layer of resin at the time using a dispensing head. The test object in FIG. 1 comprises 200 layers with a layer thickness of 100 microns each. These were created by dispensing one layer at the time and illuminating the layer, before the next layer is dispensed on top of the first layer. All layers were created using the photopolymer formulation described in Example 6. This system uses visible light with a wavelength of 460 nm to induce a radical photopolymerization process. After completion of the 3D printing process, the finished object is removed from the printing platform, washed and post exposed under UV light for 120 minutes. A solid object representing the digital image was satisfactorily created.

Example 7

In this example 960 grams of resin were prepared by mixing Neopentyl glycol propoxylate diacrylate (NPG(PO)$_2$ DA, Allnex), 18 wt %, trimethylolpropane triacrylate (TMPTA, Miramer M300, Miwon), 4 wt %, Disparlon NS-5500 (Kingsindustries), 0.7 wt % and oleic acid (Sigma Aldrich), 0.8 wt % were mixed in a metal tin. The clear reaction mixture was mixed for 30 minutes at room temperature. Then, Al6061 (LPW), 76 wt % particles were added using a Dissolver Dispermat CN10 (VMA-Getzmann GmbH) high shear mixer and shear speeds of 4000 rpm in order to obtain a homogeneous dispersion of particles in the photopolymer resin. Subsequently, bis($\eta^5$-2,4-cyclopentadien-1-yl)-bis-(2,6-difluoro-3-(1H-pyrrol-1-yl)-phenyl) titanium (IV) (Sigma Aldrich), 0.5 wt % was added and the reaction mixture was heated to 60° C. for 24 hours with occasional stirring until all solids dissolved. The 3D test object was created using the setup described in FIG. 1, which dispenses one layer of resin at the time using a dispensing head. The test object in FIG. 1 comprises 200 layers with a layer thickness of 100 microns each. These were created by dispensing one layer at the time and illuminating the layer, before the next layer is dispensed on top of the first layer. All layers were created using the photopolymer formulation described in Example 7. This system uses visible light with a wavelength of 460 nm to induce a radical photopolymerization process. After completion of the 3D printing process, the finished object is removed from the printing platform, washed and post exposed under UV light for 120 minutes. A solid object representing the digital image was satisfactorily created.

Example 8

In this example 960 grams of resin were prepared by mixing Neopentyl glycol propoxylate diacrylate (NPG(PO)$_2$ DA, Allnex), 18 wt %, trimethylolpropane triacrylate (TMPTA, Miramer M300, Miwon), 4 wt %, Disparlon NS-5500 (Kingsindustries), 0.7 wt % and oleic acid (Sigma Aldrich), 0.8 wt % were mixed in a metal tin. The clear reaction mixture was mixed for 30 minutes at room temperature. Then, Al6061 (LPW), 75 wt % particles were added using a Dissolver Dispermat CN10 (VMA-Getzmann GmbH) high shear mixer and shear speeds of 4000 rpm in order to obtain a homogeneous dispersion of particles in the photopolymer resin. Subsequently, zinc tetraphenylporphyrin (ZnTpp) (Sigma Aldrich), 1.5 wt % was added and the reaction mixture was heated to 60° C. for 24 hours with occasional stirring until all solids dissolved. The 3D test object was created using the setup described in FIG. 1, which dispenses one layer of resin at the time using a dispensing head. The test object in FIG. 1 comprises 200 layers with a layer thickness of 100 microns each. These were created by dispensing one layer at the time and illuminating the layer, before the next layer is dispensed on top of the first layer. All layers were created using the photopolymer formulation described in Example 8. This system uses visible light with a wavelength of 635 nm to induce a radical photopolymerization process. After completion of the 3D printing process, the finished object is removed from the printing platform, washed and post exposed under UV light for 120 minutes. A solid object representing the digital image was satisfactorily created.

Example 9

In this example 635 grams of resin were prepared by mixing 1,6 hexanediol diacrylate (HDDA, Miramer M200, Miwon), 9 wt %, trimethylolpropane triacrylate (TMPTA, Miramer M300, Miwon), 1 wt %, Disparlon NS-5500 (Kingsindustries), 0.4 wt % and oleic acid (Sigma Aldrich), 0.3 wt % were mixed in a metal tin. The clear reaction mixture was mixed for 30 minutes at room temperature. Then, Inconel 718 (LPW), 89 wt % particles were added using a Dissolver Dispermat CN10 (VMA-Getzmann GmbH) high shear mixer and shear speeds of 4000 rpm in order to obtain a homogeneous dispersion of particles in the photopolymer resin. Subsequently, bis($\eta^5$-2,4-cyclopentadien-1-yl)-bis-(2,6-difluoro-3-(1H-pyrrol-1-yl)-phenyl) titanium (IV) (Sigma Aldrich), 0.4 wt % was added and the reaction mixture was heated to 60° C. for 24 hours with occasional stirring until all solids dissolved. The 3D test object was created using the setup described in FIG. 1, which dispenses one layer of resin at the time using a dispensing head. The test object in FIG. 1 comprises 200 layers with a layer thickness of 100 microns each. These were created by dispensing one layer at the time and illuminating the layer, before the next layer is dispensed on top of the first layer. All layers were created using the photopolymer formulation described in Example 9. This system uses visible light with a wavelength of 460 nm to induce a radical photopolymerization process. After completion of the 3D printing process, the finished object is removed from the printing platform, washed and post exposed under UV light for 120 minutes. A solid object representing the digital image was satisfactorily created.

Example 10

In this example 325 grams of resin were prepared by mixing urethane dimethacrylate (UDMA, Ebecryl 4859, Allnex), 12.5 wt %, triethyleneglycol dimethacrylate (TEGDMA, Miramer M233, Miwon), 12.5 wt % and Genomer 7302 (Rahn), 3 wt % were mixed in a metal tin and the colourless reaction mixture was stirred for 30 minutes at room temperature. Then, SC5500-SMJ (Admatechs), 70 wt % silica particles were added using a Dissolver Dispermat CN10 (VMA-Getzmann GmbH) high shear mixer and shear speeds of 4000 rpm in order to obtain a homogeneous dispersion of particles in the photopolymer resin. Subsequently, bis($\eta^5$-2,4-cyclopentadien-1-yl)-bis-(2,6-difluoro-3-(1H-pyrrol-1-yl)-phenyl) titanium (IV) (Sigma Aldrich), 2 wt % was added and the reaction mixture was heated to 60° C. for 24 hours with occasional stirring until all solids dissolved. The 3D test object was created using the setup described in FIG. 1, which dispenses one layer of resin at the time using a dispensing head. The test object in FIG. 1 comprises 200 layers with a layer thickness of 100 microns each. These were created by dispensing one layer at the time and illuminating the layer, before the next layer is dispensed on top of the first layer. All layers were created using the photopolymer formulation described in Example 10. This system uses visible light with a wavelength of 460 nm to induce a radical photopolymerization process. After completion of the 3D printing process, the finished object is removed from the printing platform, washed and post exposed under UV light for 120 minutes. A solid object representing the digital image was satisfactorily created.

Example 11

In this example 325 grams of resin were prepared by mixing urethane dimethacrylate (UDMA, Ebecryl 4859, Allnex), 12.5 wt %, triethyleneglycol dimethacrylate (TEGDMA, Miramer M233, Miwon), 12.5 wt % and Genomer 7302 (Rahn), 3 wt % were mixed in a metal tin and the colourless reaction mixture was stirred for 30 minutes at room temperature. Then, SC2500-SMJ (Admatechs), 70 wt % silica particles were added using a Dissolver Dispermat CN10 (VMA-Getzmann GmbH) high shear mixer and shear speeds of 4000 rpm in order to obtain a homogeneous dispersion of particles in the photopolymer resin. Subsequently, bis($\eta^5$-2,4-cyclopentadien-1-yl)-bis-(2,6-difluoro-3-(1H-pyrrol-1-yl)-phenyl) titanium (IV) (Sigma Aldrich), 2 wt % was added and the reaction mixture was heated to 60° C. for 24 hours with occasional stirring until all solids dissolved. The 3D test object was created using the setup described in FIG. 1, which dispenses one layer of resin at the time using a dispensing head. The test object in FIG. 1 comprises 200 layers with a layer thickness of 100 microns each. These were created by dispensing one layer at the time and illuminating the layer, before the next layer is dispensed on top of the first layer. All layers were created using the photopolymer formulation described in Example 11. This system uses visible light with a wavelength of 460 nm to induce a radical photopolymerization process. After completion of the 3D printing process, the finished object is removed from the printing platform, washed and post exposed under UV light for 120 minutes. A solid object representing the digital image was satisfactorily created.

Example 12

In this example 325 grams of resin were prepared by mixing urethane dimethacrylate (UDMA, Ebecryl 4859, Allnex), 12.5 wt %, triethyleneglycol dimethacrylate (TEGDMA, Miramer M233, Miwon), 12.5 wt % and triethanolamine (Sigma Aldrich), 2 wt % were mixed in a metal tin and the colourless reaction mixture was stirred for 30 minutes at room temperature. Then, SC2500-SMJ (Admatechs), 70 wt % silica particles were added using a Dissolver Dispermat CN10 (VMA-Getzmann GmbH) high shear mixer and shear speeds of 4000 rmp in order to obtain a homogeneous dispersion of particles in the photopolymer resin. Subsequently, zinc tetraphenylporphyrin (ZnTpp) (Sigma Aldrich), 3 wt % was added and the reaction mixture was heated to 60° C. for 24 hours with occasional stirring until all solids dissolved. The 3D test object was created using the setup described in FIG. 1, which dispenses one layer of resin at the time using a dispensing head. The test object in FIG. 1 comprises 200 layers with a layer thickness of 100 microns each. These were created by dispensing one layer at the time and illuminating the layer, before the next layer is dispensed on top of the first layer. All layers were created using the photopolymer formulation described in Example 12. This system uses visible light with a wavelength of 635 nm to induce a radical photopolymerization process. After completion of the 3D printing process, the finished object is removed from the printing platform, washed and post exposed under UV light for 120 minutes. A solid object representing the digital image was satisfactorily created.

Example 13

In this example 550 grams of photopolymer formulation were prepared by mixing trimethylolpropane triacrylate (TMPTA, Miramer M300, Miwon), 48% wt and (3,4-epoxycyclohexane) methyl 3,4-epoxycyclohexylcarboxylate (UVA Cure 1500, Allnex), 45 wt % were mixed in a black plastic bottle. The clear reaction mixture was stirred for 30 minutes at room temperature. Then, bis-(4-t-butylphenyl)-iodonium hexafluorophosphate (Speedcure 938, Lambson), 4 wt % and zinc tetraphenylporphyrin (Sigma Aldrich), 2 wt % and triethanolamine (Sigma Aldrich), 1 wt % were added to the reaction mixture and the reaction mixture was sonicated for 60 minutes at room temperature until all solids dissolved. The 3D test object was created using the setup described in FIG. 1, which dispenses one layer of resin at the time using a dispensing head. The test object in FIG. 1 comprises 200 layers with a layer thickness of 100 microns each. These were created by dispensing one layer at the time and illuminating the layer, before the next layer is dispensed on top of the first layer. All layers were created using the photopolymer formulation described in Example 13. This system uses visible light with a wavelength of 635 nm to induce a cationic photopolymerization process. After completion of the 3D printing process, the finished object is removed from the printing platform, washed and post exposed under UV light at 60° C. for 120 minutes. A solid object representing the digital image was satisfactorily created.

Example 14

In this example 550 grams of photopolymer formulation were prepared by mixing trimethylolpropane triacrylate (TMPTA, Miramer M300, Miwon), 48% wt and (3,4-epoxycyclohexane) methyl 3,4-epoxycyclohexylcarboxylate (UVA Cure 1500, Allnex), 45 wt % were mixed in a black plastic bottle. The clear reaction mixture was stirred for 30 minutes at room temperature. Then, bis-(4-t-butylphenyl)-iodonium hexafluorophosphate (Speedcure 938, Lambson), 4 wt % and zinc tetraphenylporphyrin (Sigma Aldrich), 2 wt % and triethanolamine (Sigma Aldrich), 1 wt % were added to the reaction mixture and the reaction mixture was sonicated for 60 minutes at room temperature until all solids dissolved. Subsequently, SWD 775 Red (Sun Chemicals), 2 wt % was added to the reaction mixture and the resulting red-brown reaction mixture was stirred for 45 minutes at room temperature. The 3D test object was created using the setup described in FIG. 1, which dispenses one layer of resin at the time using a dispensing head. The test object in FIG. 1 comprises 200 layers with a layer thickness of 100 microns each. These were created by dispensing one layer at the time and illuminating the layer, before the next layer is dispensed on top of the first layer. All layers were created using the photopolymer formulation described in Example 14. This system uses visible light with a wavelength of 635 nm to induce a cationic photopolymerization process. After completion of the 3D printing process, the finished object is removed from the printing platform, washed and post exposed under UV light at 60° C. for 120 minutes. A solid object representing the digital image was satisfactorily created.

Example 15

In this example 750 grams of photopolymer resin were prepared by mixing Photocryl E207/30 PE (Miwon), 20 wt % and (3,4-epoxycyclohexane) methyl 3,4-epoxycyclohexylcarboxylate (UVA Cure 1500, Allnex), 40 wt % were mixed in a black plastic bottle. The clear reaction mixture was stirred for 30 minutes at room temperature. Then, bis-(4-t-butylphenyl)-iodonium hexafluorophosphate (Speedcure 938, Lambson), 6 wt % and zinc tetraphenylporphyrin (Sigma Aldrich), 4 wt % and triethanolamine (Sigma Aldrich), 1 wt % were added to the reaction mixture and the reaction mixture was sonicated for 60 minutes at room temperature until all solids dissolved. The 3D test object was created using the setup described in FIG. 1, which dispenses one layer of resin at the time using a dispensing head. The test object in FIG. 1 comprises 200 layers with a layer thickness of 100 microns each. These were created by dispensing one layer at the time and illuminating the layer, before the next layer is dispensed on top of the first layer. All layers were created using the photopolymer formulation described in Example 15. This system uses visible light with a wavelength of 635 nm to induce a cationic photopolymerization process. After completion of the 3D printing process, the finished object is removed from the printing platform, washed and post exposed under UV light at 60° C. for 120 minutes. A solid object representing the digital image was satisfactorily created.

Example 16

The 3D test object was created using the setup described in FIG. 2, which dispenses one layer of resin at the time using a dispensing head located to the left of the exposure bed and then one layer of resin from the dispensing head located the right of the exposure bed. Both dispensing heads were enabled to travel fully over the exposure bed separately delivering even layers of two different materials. The test object in FIG. 2 comprises 200 layers with a layer thickness of 100 microns each. These were created by dispensing one layer at the time and illuminating the layer, before the next layer is dispensed on top of the first layer. In this example the first 100 layers were created using the formulation of Example 1 and the second set of 100 layers was created using the formulation described in Example 3. After completion of the 3D printing process, the finished object was removed from the printing platform, washed and post exposed under UV light at 60° C. for 120 minutes. A solid object representing the digital image was satisfactorily created which had two differing properties with a change in the object's properties half way up its vertical axis.

Example 17

The 3D test object was created using the setup described in FIG. 2, which dispenses one layer of resin at the time using a dispensing head located to the left of the exposure bed and then one layer of resin from the dispensing head located the right of the exposure bed. Both dispensing heads were enabled to travel fully over the exposure bed separately delivering even layers of two different materials. The test object in FIG. 2 comprises 200 layers with a layer thickness of 100 microns each. These were created by dispensing one layer at the time and illuminating the layer, before the next layer is dispensed on top of the first layer. In this example the first 100 layers were created using the formulation of Example 2 and the second set of 100 layers was created using the formulation described in Example 13. After completion of the 3D printing process, the finished object was removed from the printing platform, washed and post exposed under UV light at 60° C. for 120 minutes. A solid object representing the digital image was satisfactorily created which had two differing properties with a change in the object's properties half way up its vertical axis.

Example 18

The 3D test object was created using the setup described in FIG. 2, which dispenses one layer of resin at the time using a dispensing head located to the left of the exposure bed and then one layer of resin from the dispensing head located the right of the exposure bed. Both dispensing heads were enabled to travel fully over the exposure bed separately delivering even layers of two different materials. The test object in FIG. 2 comprises 200 layers with a layer thickness of 100 microns each. These were created by dispensing one layer at the time and illuminating the layer, before the next layer is dispensed on top of the first layer. In this example the first 100 layers were created using the formulation of Example 2 and the second set of 100 layers was created using the formulation described in Example 7. After completion of the 3D printing process, the finished object is removed from the printing platform, washed and post exposed under UV light at 60° C. for 120 minutes. A solid object representing the digital image was satisfactorily created which had two differing properties with a change in the object's properties half way up its vertical axis.

Example 19

The 3D test object was created using the setup described in FIG. 2, which dispenses one layer of resin at the time using a dispensing head located to the left of the exposure bed and then one layer of resin from the dispensing head located the right of the exposure bed. Both dispensing heads were enabled to travel fully over the exposure bed separately delivering even layers of two different materials. The test object in FIG. 2 comprises 200 layers with a layer thickness of 100 microns each. These were created by dispensing one layer at the time and illuminating the layer, before the next layer is dispensed on top of the first layer. In this example the first 100 layers were created using the formulation of Example 4 and the second set of 100 layers was created using the formulation described in Example 10. After completion of the 3D printing process, the finished object is removed from the printing platform, washed and post exposed under UV light at 60° C. for 120 minutes. A solid object representing the digital image was satisfactorily created which had two differing properties with a change in the object's properties half way up its vertical axis.

The invention claimed is:

1. A method for creating a 3D object, the method comprising:
   a) dispensing a layer of liquid or slurry light-curable material over a visual display screen via a dispensing head;
   b) subjecting the layer of liquid or slurry light-curable material to light from the visual display screen to form a cured image on a print platform;
   c) separating the visual display screen and the cured image to enable the dispensing head to pass between the build platform and visual display screen; and
   d) repeating steps a) to c) at least once to form the 3D object,
      wherein step a) comprises passing the dispensing head between the build platform and the visual display screen, and
      wherein the method further comprises recycling an excess amount of the dispensed material from a fluid chamber arranged below the visual display screen back to the dispensing head.

2. The method of claim 1, wherein the dispensing head is one of a first dispensing head and a second dispensing head, wherein the light-curable material is one of a first light-curable material and a second light-curable material respectively dispensed from the first and second dispensing heads, and wherein at least one of the layers of liquid or slurry light-curable material comprises the first light-curable material and at least one of the layers of liquid or slurry light-curable material comprises the second material.

3. The method of claim 1, wherein the light-curable material comprises a photopolymer resin formulation comprising:
   at least one monomeric or oligomeric chemical species comprising at least one carbon-carbon double bond that is polymerisable by free radical polymerisation being present at a total amount of 10-98 wt %
   or at least one monomeric or oligomeric chemical species comprising at least one heterocyclic moiety that is polymerisable by cationic polymerisation being present at a total amount of 10-98 wt %;
   at least one photoinitiator that absorbs visible blue, green, or red light in the region between 400 nm and 700 nm present at a total amount of 0.1-10 wt %;
   at least one co-initiator;
   and optionally a plurality of pigments and dyes.

4. The method of claim 3, wherein the light-curable material is said photopolymer resin formulation.

5. The method of claim 3, wherein the liquid or slurry light-curable material is the slurry light-curable material, the slurry material comprising a plurality of particles suspended as a slurry in said photopolymer resin formulation.

6. The method of claim 5, wherein the dispensing head dispenses the layer only over an area that the object can be created within.

7. The method of claim 1, further comprising levelling the layer by the dispensing head during said dispensing.

8. The method of claim 1, further comprising capturing the excess dispensed material in at least one catch pot.

9. The method of claim 8, wherein the at least one catch pot is arranged in a position separated, and/or spaced laterally from the build platform.

10. The method of claim 8, wherein the excess material captured by the at least one catch pot flows into the fluid chamber and is forced back to the dispensing head via a pump.

11. The method of claim 8, wherein the excess material is filtered before the excess material is forced back to the dispensing head.

12. A 3D printer comprising:
    a build platform;
    a visual display screen for subjecting successive layers of a liquid or slurry light-curable material to curing light selectively;
    a dispensing head for dispensing the successive layers of liquid or slurry light-curable material over the visual display screen;
    a fluid chamber arranged below the visual display screen; and
    an actuator for varying a separation between the build platform and the visual display screen,
    wherein the dispensing head is configured to pass between the build platform and the visual display screen for said dispensing, and
    wherein the 3D printer is configured to recycle an excess amount of the dispensed material from the fluid chamber back to the dispensing head.

13. The 3D printer of claim 12, wherein the visual display screen is a liquid crystal display screen.

14. The 3D printer of claim 12, wherein the visual display screen is one of a plurality of visual display screens laid out in the same horizontal plane, and wherein the build platform is aligned with the plurality of visual display screens.

15. The 3D printer of claim 12, wherein the dispensing head is one of a first dispensing head and a second dispensing head each being configured for dispensing respective ones of the successive layers of liquid or slurry light-curable material.

16. The 3D printer of claim 12, further comprising a robocasting head.

17. The 3D printer of claim 12, further comprising an inkjet head.

18. The 3D printer of claim 12, further comprising a fused deposition modelling head.

19. The 3D printer of claim 12, further comprising a leveller for evening the thickness of the successive layers of liquid or slurry light-curable material.

20. The 3D printer of claim 19, wherein the leveller forms part of the dispensing head.

21. The 3D printer of claim 19, wherein the leveller has at least one roller.

22. The 3D printer of claim 19, wherein the leveler comprises a pair of rollers that form part of the dispensing head and are situated on either side of one or more dispensing nozzles of the dispensing head.

23. The 3D printer of claim 12, further comprising at least one catch pot for capturing the excess material.

24. The 3D printer of claim 23, wherein the at least one catch pot is separated and/or spaced laterally from the build platform.

25. The 3D printer of claim 23, further comprising a pump, wherein the excess material captured by the at least one catch pot flows into the fluid chamber and is forced back to the dispensing head via the pump.

26. The 3D printer of claim 25, further comprising a filter configured to filter the excess material before the excess material is forced back to the dispensing head.

\* \* \* \* \*